United States Patent [19]

Mojden et al.

[11] Patent Number: 4,681,507
[45] Date of Patent: Jul. 21, 1987

[54] METHOD OF AUTOMATICALLY DE-BAGGING CAN ENDS AND LIKE ARTICLES

[75] Inventors: Wallace W. Mojden, Hinsdale; Robert E. Darr, Chicago, both of Ill.

[73] Assignee: Fleetwood Systems, Inc., Countryside, Ill.

[21] Appl. No.: 823,348

[22] Filed: Jan. 28, 1986

Related U.S. Application Data

[62] Division of Ser. No. 541,362, Oct. 12, 1983, Pat. No. 4,580,938.

[51] Int. Cl.⁴ .............................................. B65B 69/00
[52] U.S. Cl. .................................... 414/786; 414/412
[58] Field of Search ................. 53/384; 414/403, 411, 414/412, 786

[56] References Cited

U.S. PATENT DOCUMENTS

| 3,441,156 | 4/1969 | Bofinger et al. | 414/412 |
| 4,504,183 | 3/1985 | Bennison et al. | 414/412 |
| 4,531,878 | 7/1985 | Tamura | 414/412 |

Primary Examiner—L. J. Paperner
Assistant Examiner—Janice Krizek
Attorney, Agent, or Firm—Trexler, Bushnell, Giangiorgi & Blackstone, Ltd.

[57] ABSTRACT

Method and apparatus for de-palletizing and de-bagging stacks of articles such as can ends is disclosed. The de-palletizing apparatus removes a single layer of bags and discharges single bags of articles in seriatim order to a tilt tray comprising part of the de-bagging apparatus. The tilt tray moves the bag of articles to a vertical position, and inserts the bagged articles in a movable pocket at a loading station. Opposed clamps engage the bottom of the bag and a pin below the bag is forced upwardly, thereby pushing the articles in the bag upwardly so as to form a void at the bag bottom. The movable pocket is then moved past a slitter station, where the bag bottom is severed and discarded, to a de-bagging station. The opposed clamps are released, and a second set of movable clamps engage the bag to force the bag upwardly. As the bag moves upwardly, a pair of opposed rollers draw the bag off the stacked articles. The now-debagged stack of articles is moved to a discharge station.

9 Claims, 29 Drawing Figures

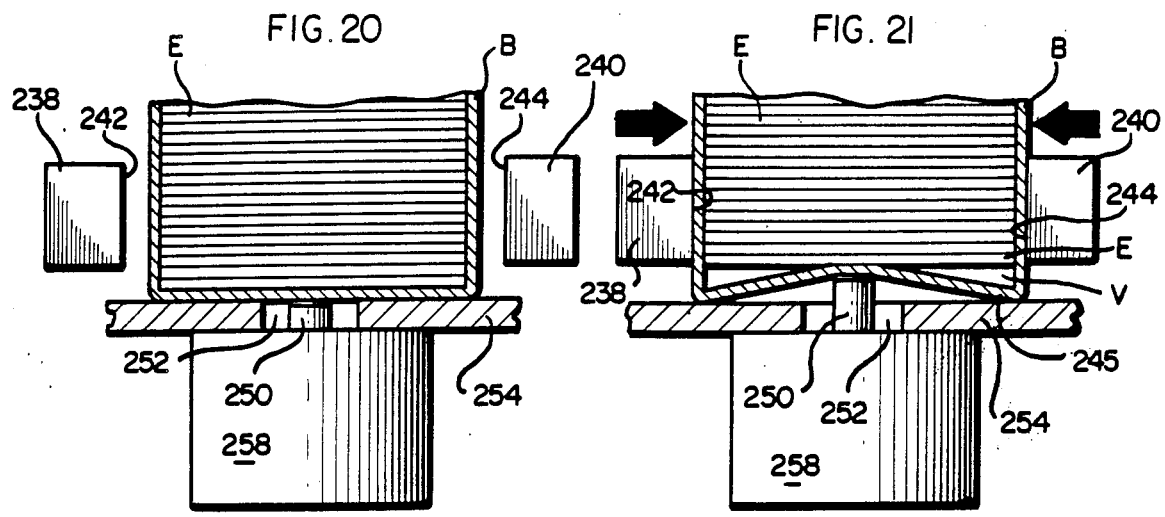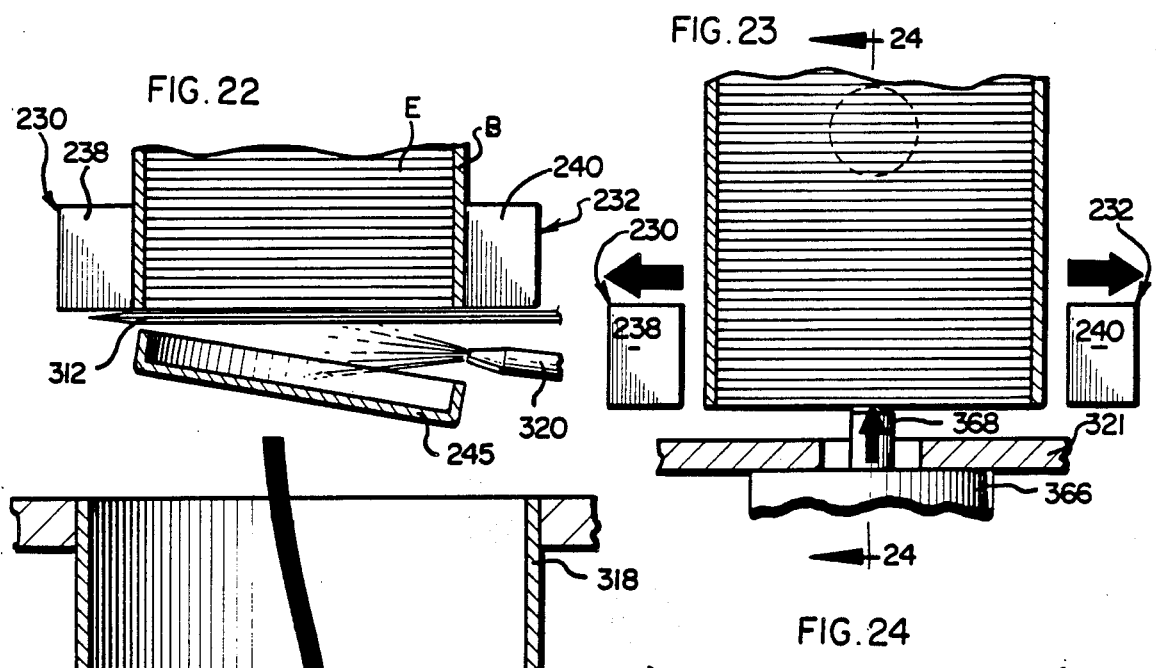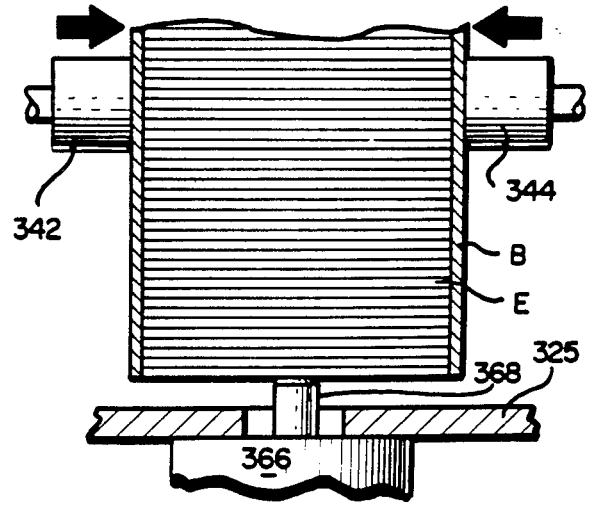

METHOD OF AUTOMATICALLY DE-BAGGING CAN ENDS AND LIKE ARTICLES

This is a divisional of co-pending application Ser. No. 541,362 filed on Oct. 12, 1983, now U.S. Pat. No. 4,580,938.

BACKGROUND OF THE INVENTION

The present invention relates to methods and apparatus for automated article handling, and more particularly concerns methods and apparatus for automatically de-bagging container ends.

Two-piece and three-piece cans are widely used for packaging beverages, foods, petroleum, and a great number of other products. In the manufacture of these containers, it is common to provide a can fabricating or closing machine with a supply of can bodies, and with a supply of separate, pre-formed can ends. The ends are usually provided to the machinery in elongated stacks, and the stacks are delivered to the canning or processing plant in elongated kraft paper bags.

The can fabrication or closure activity occurs at a high rate of speed, and so a large number of can ends are commonly used in a short time. Accordingly, an effectively endless supply of can ends must be provided to the fabricating or closing machinery by an infeed unit, or the like. Can end supply or infeed units which have met with wide commercial acceptance are illustrated in U.S. Pat. No. 3,722,741, and employ a number of individual pockets for receiving and storing a stack of ends preparatory to delivery to the fabricating machinery.

Before the stacks of can ends are supplied to the fabricating machinery, the bags must be removed from the stacks. The removal of these bags has been accomplished by hand, in that a bag is placed in the pocket of the infeed unit and the bag is then manually stripped from the stack of ends. A previous mechanism for automatically de-bagging stacks of can ends is shown in U.S. Pat. No. 4,245,946 to McCullough et al., but this device has not met with extensive acceptance.

SUMMARY OF THE INVENTION

The present invention includes, de-bagging apparatus wherein a bag containing a stack of ends is oriented, preferably in a vertical position, within a transport tray or pocket. Next the bag is clamped without effecting simultaneous clamped engagement of the ends sufficient to preclude relative movement. The ends are then moved relative to the bottom of the bag to provide a gap or space therebetween. A slitter mechanism is next employed which engages the bag in the area of the gap or space to sever and remove the bag end. The now severed bag is drawn off or removed from the stack of ends which remain in the transport tray or pocket.

Finally, the de-bagged stack of ends is transferred from the de-bagging apparatus for delivery to a can end infeed unit, or for delivery directly to the processing or fabricating machinery.

The present invention further includes, in its illustrated embodiment, de-palletizer apparatus for unloading a pallet bearing a number of layers of bagged can ends. This apparatus includes a pusher device which pushes a single layer of the bagged ends from the pallet to a receiving table. The table is then tipped to move the bagged ends to an escapement device, which discharges each bag of ends to the de-bagging apparatus.

The advantages and improvements provided by and attained with the present invention will become apparent upon reading the following detailed description and upon reference to the drawings. Throughout the drawings, like reference numerals refer to like parts.

BRIEF DESCRIPTION OF THE DRAWINGS

FIGS. 20-28 are schematic fragmentary elevational views, in partial section, and showing the sequence of operation of the apparatus commencing with the initial position of the filled bag, through the space or gap development steps; slitting, bag removal and transfer to the storage trays of the infeed supply apparatus.

DETAILED DESCRIPTION

While the invention will be described in connection with the preferred illustrated embodiments and procedures, it will be understood that it is not intended to limit the invention to either of these embodiments or procedures. On the contrary, it is intended that the present invention cover all alternatives, modifications and equivalents as may be included within the spirit and scope of the invention as defined by the appended claims.

Figure 1:
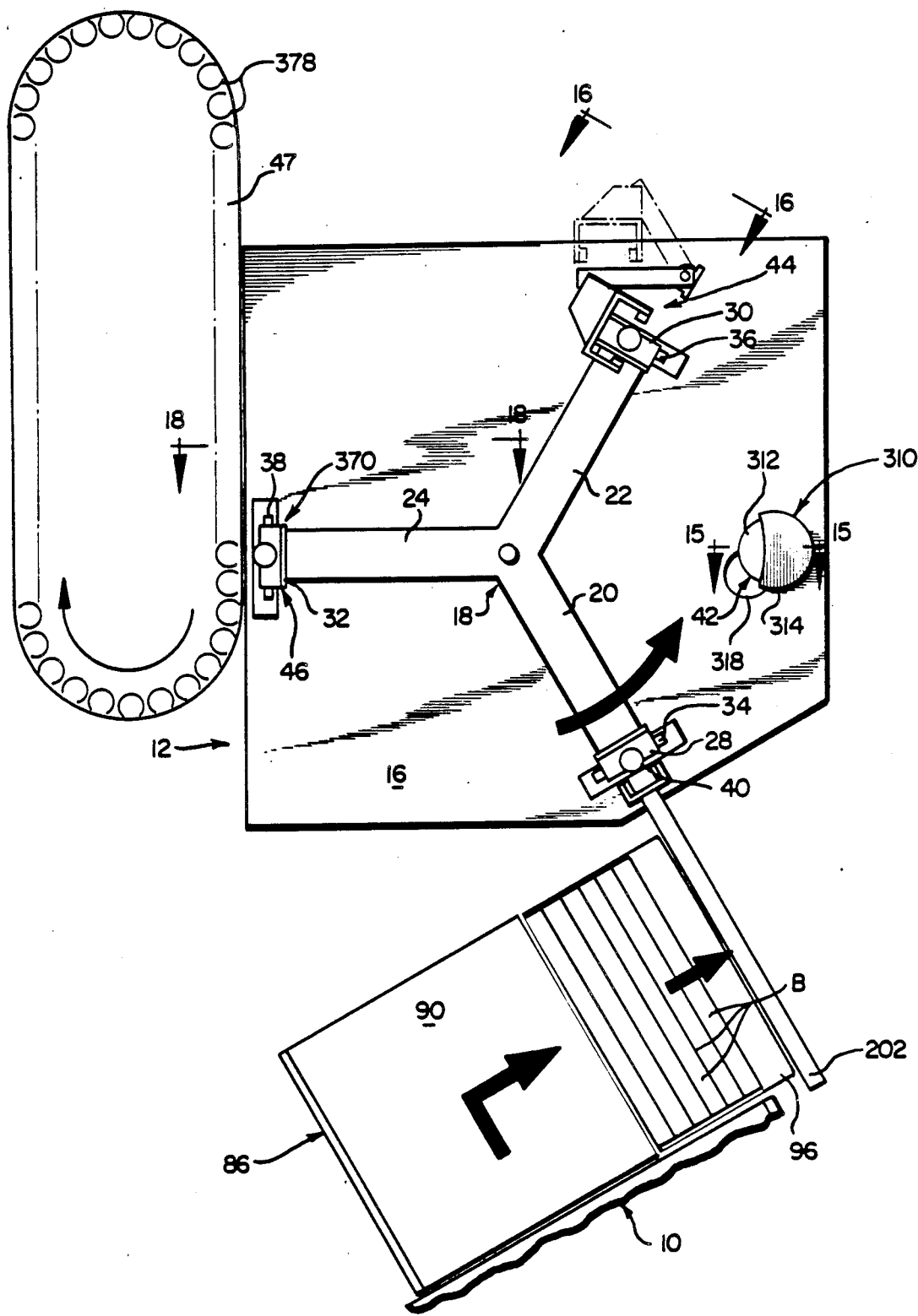
FIG. 1 is a schematic top plan view showing a first embodiment of the novel de-palletizing and de-bagging apparatus in its general aspect.
Figure 9:
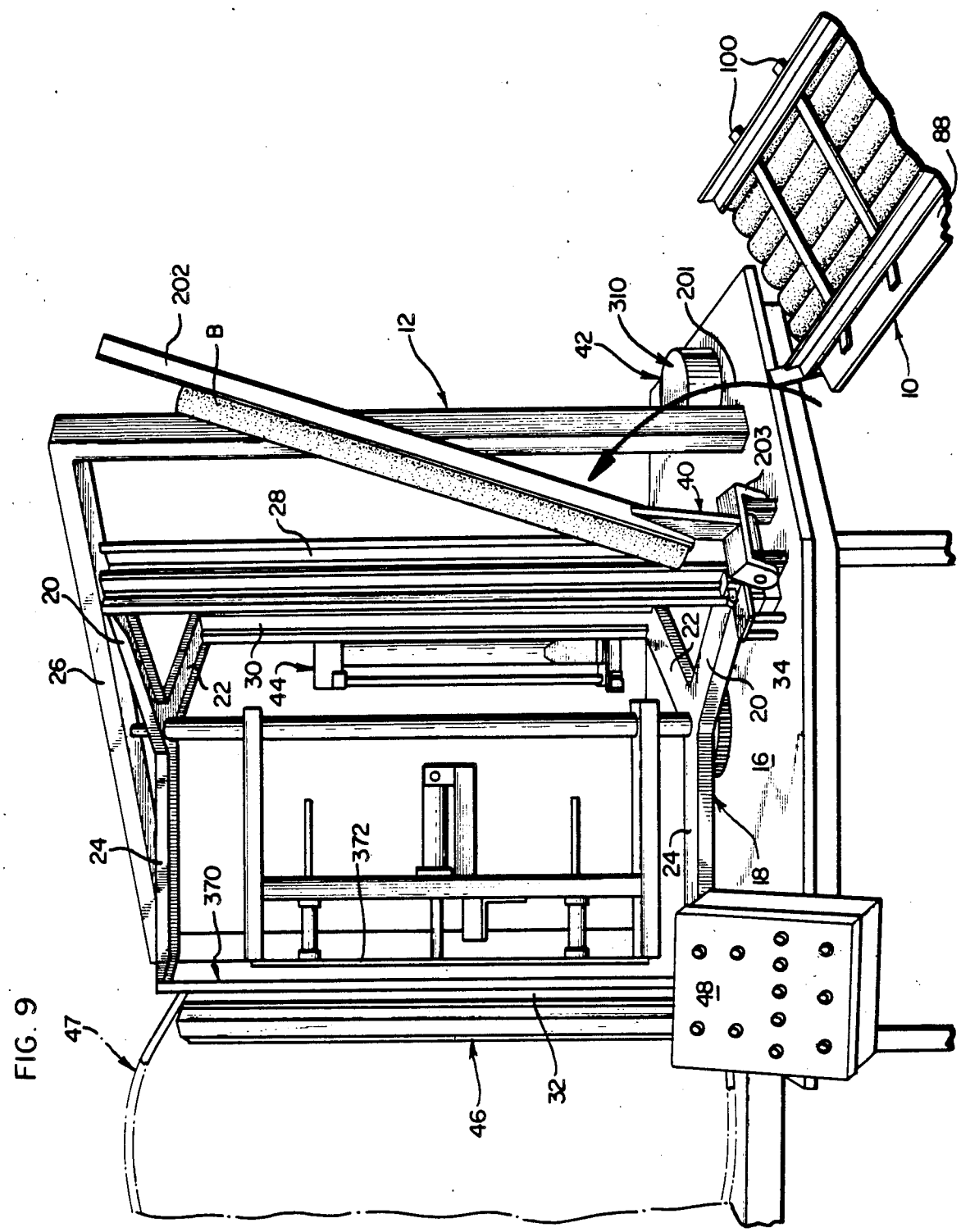
FIG. 9 is a perspective view showing the de-bagging apparatus in its overall or general aspect, together with part of the associated de-palletizing escapement mechanism, the de-palletizer mechanism having been re-located from the illustration in FIGS. 1–8 for purposes of clarity.

As shown particularly in FIGS. 1 and 9, the apparatus can be considered to include, in general, de-palletizing apparatus 10 and de-bagging apparatus 12. Pallets of bagged articles, such as can ends, are delivered by a fork-lift truck (not shown) to the de-palletizing apparatus 10. Here the bags of ends are de-palletized for delivery to the de-bagging apparatus 12. Once de-bagged, stacks of articles such as can ends are then supplied to downstream processing or storage apparatus by the de-bagging device 12.

The de-palletizing apparatus 10 includes an elevating pallet support table 52 from which layers of bagged articles are delivered to a receiving table 86. The receiving table 86 in turn delivers these bags of articles to an escapement mechanism 96 which releases the bags in spaced, seriatim order to a tilt or supply tray 202 forming part of the de-bagging apparatus 12.

The de-bagging apparatus 12 includes, in general, a base or support 16 upon which is mounted a rotatable frame device 18 having individual sections or legs 20, 22 and 24 spaced apart at substantially 120 degrees from one another. This frame 18 is supported by an appropriate superstructure 26. Each leg terminates at an elongated, vertically upstanding de-bagger pocket 28, 30 and 32. At the bottom of each de-bagger pocket is an arrangement of opposed, clamps 34, 36 and 38. By rotating the frame 18, these pockets 28-32 and the associated holding clamps 34-38 are moved in sequential order from a first or loading station 40 past a slitting point 42 to a second or de-bagging station 44, and from that de-bagging station 44 to a third or delivery station 46. At the delivery station 46, the de-bagged articles can be transferred from the de-bagger or transfer pockets 30, 32 or 34 to downstream machinery or to an infeed can end storage unit 47, as shown in FIGS. 1 and 9. A control panel 48, FIG. 9, is provided for housing the control apparatus and logic circuitry for actuating, monitoring and controlling the entire system or any of its component parts. It will be understood that requisite operations can be carried out at all three stations simultaneously: bagged articles can be loaded into a receiving or transport pocket 28 at the first station 40 while bag stripping is occuring at the second station 44, and while article delivery is occuring at the third station 46.

The De-Palletizing Apparatus

As explained above, it is contemplated that can ends or other articles will be arrayed in a preset manner when they are brought to the processing machinery comprising the present invention. As suggested in FIGS. 2-4, it is assumed here that stacks of can ends E are carried in elongated kraft paper bags B. Further, it is assumed that the bagged stacks of can ends are arranged in an array A of vertically stacked horizontal layers L on a movable pallet P of common design. This array A of bagged can end stacks is held in the desired arrangement by one or more elongated strips of industrial tape which are wound in a "snake-wrap" or serpentine fashion through the bagged can end stack array A. Apparatus for providing such an array of palletized, stacked and tape-restrained filled bags is shown in co-pending U.S. application Ser. No. 459,978 filed Jan. 21, 1983 now U.S. Pat. No. 4,537,010.

Figure 3:
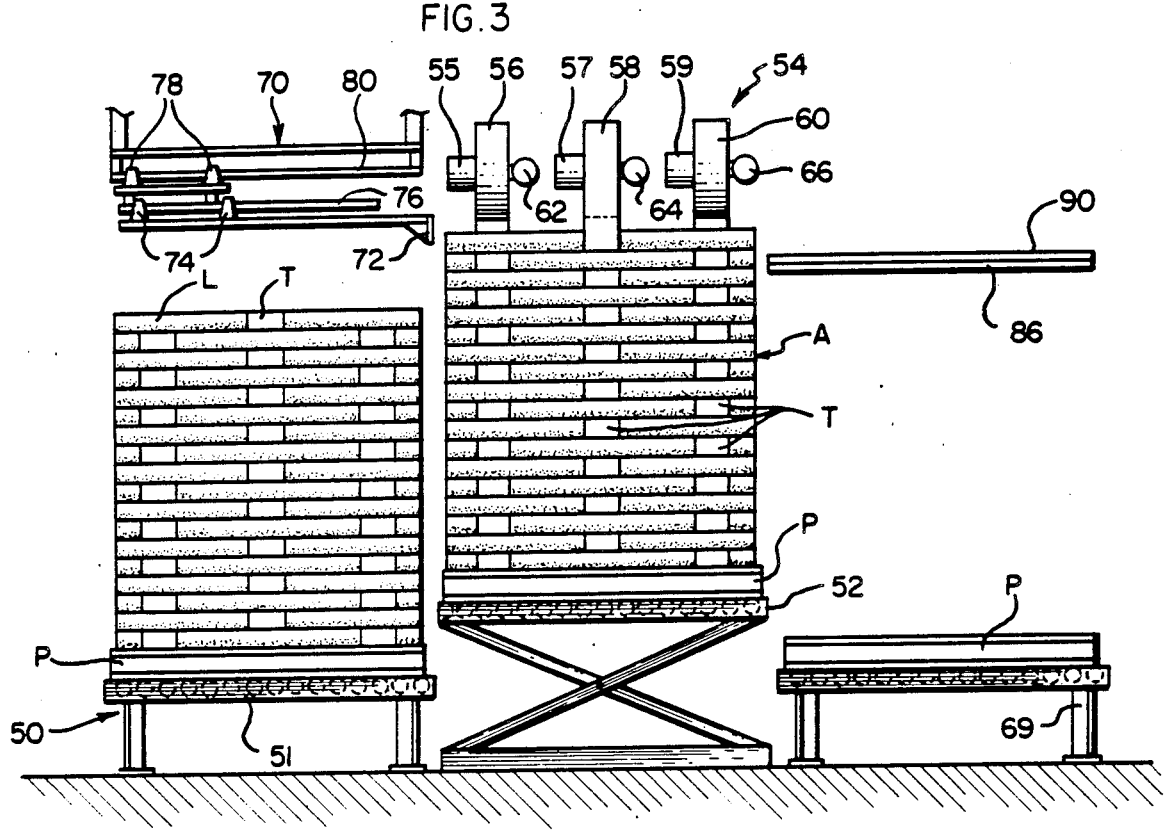
FIG. 3 is a side elevational view showing the de-palletizing apparatus in further detail.

With reference to FIG. 3, a pallet P bearing an array A of bags of can ends can be brought to a roller stand 50 by a fork-lift truck or other convenient device (not shown). Once located at the initial roller stand 50, the entire pallet P and array A can be manually or mechanically pushed over the rollers 51 from the fixed roller stand 50 to an elevating roller table stand 52. In a preferred form of the invention, the rollers 51 at stand 50 will be powered to advance the pallet P as needed.

Figure 2:
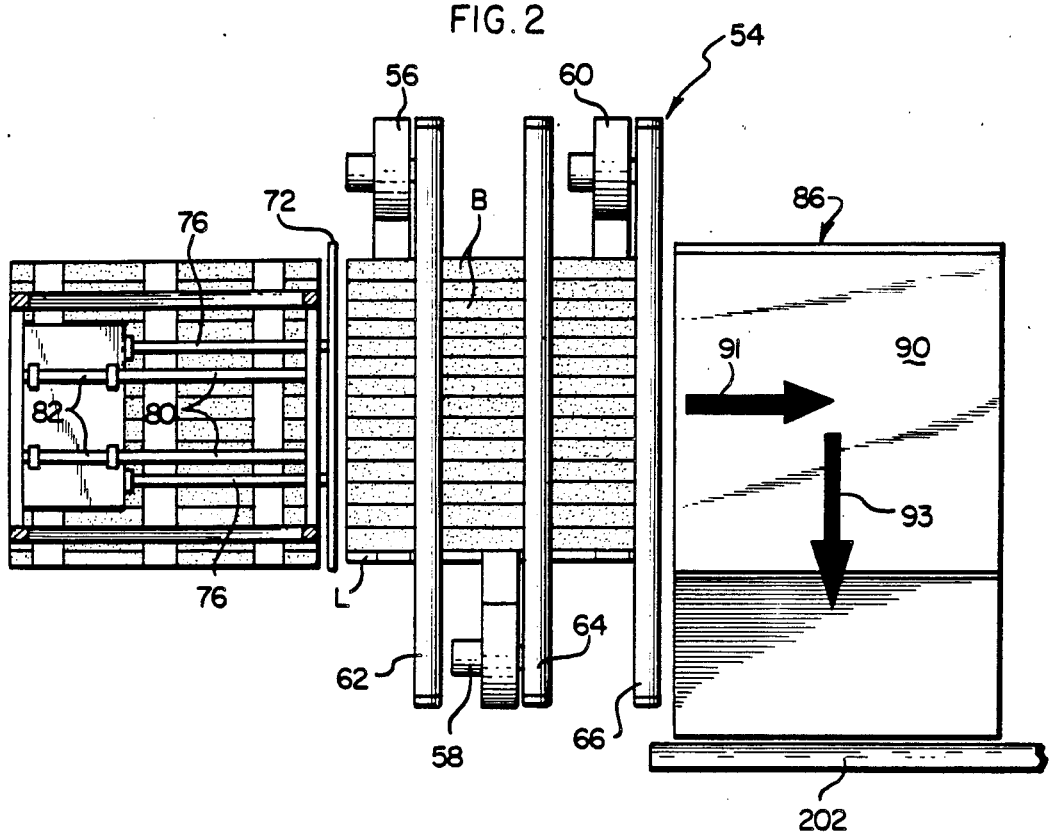
FIG. 2 is a top plan view showing in further detail the de-palletizing portion of the apparatus.
Figure 4:
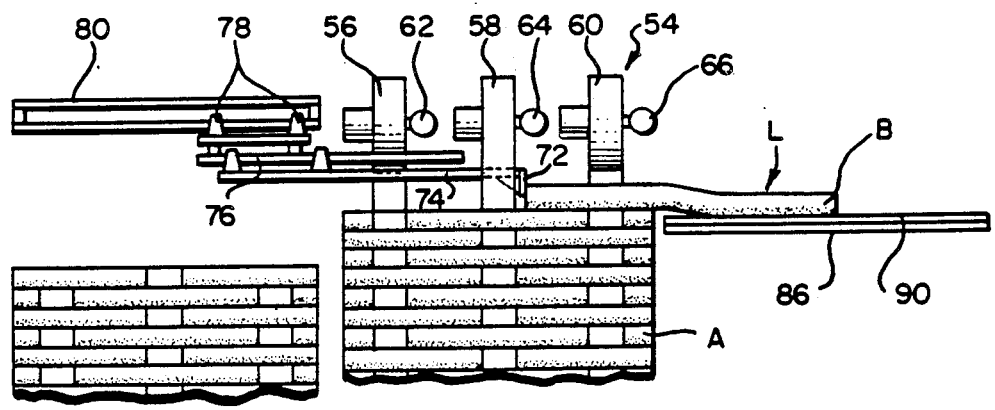
FIG. 4 is a fragmentary side elevational view similar to FIG. 3 but showing the de-palletizing apparatus as it appears during urging of a top layer of can end stacks off the pallet and on to a receiving table for delivery to the de-bagging apparatus.

This elevating table 52 is located directly under a tape removal mechanism 54, as especially shown in FIGS. 2, 3, and 4. The mechanism 54 can be a suitably modified version of the tape dispensing means described and shown in U.S. patent application Ser. No. 459,978 filed Jan. 21, 1983 now U.S. Pat. No. 4,537,010. More specifically, the tape removal mechanism 54 here includes a series of tape take-up rolls 56, 58, 60 mounted to associated transport devices 62, 64, 66 such as fluid power cylinder devices or other convenient mechanisms. The transport devices move the take-up devices 56-60 back and forth across the article stack A so as to take-up and remove the strips of tape T from the palletized stack of bags, in a layer-by-layer sequence. Each take-up roll is powered by a small horsepower air or electrically energized motor 55, 57, 59. During use the motors 55, 57 and 59 will place the tape under tension so as to tend to lift the uppermost layer L of bags from the palletized stack, which facilitates discharge of the layer by the pusher bar mechanism to be discussed.

It will be understood, of course, that this tape removing and take-up is not accomplished all at once. Rather, a single run or layer of tape T is removed and a single layer of bagged can end stacks are thus released for discharge from the pallet. When this top-most layer has been disposed of as explained below, the elevating table mechanism, which is in the form of a scissors lift, indexes upwardly and the tape removal mechanism 54 is cycled again so as to untape and ready the next layer of bagged articles for delivery. When the pallet P is completely unloaded, the elevating table mechanism 52 is returned to its lower-most position, and the pallet P is pushed from that elevating table 52 to a pallet receiving table 69 or other storage device for disposition.

As particularly illustrated in FIGS. 2-4, the top-most, now-untaped layer L of bagged articles is urged from the array A to a downstream receiving table 86. This operation is performed after the support tape has been removed, and the underlying sections of tape placed in tension to raise the uppermost layer L slightly above the lower layer. Removal of the layer L is accomplished by a pusher mechanism 70. The pusher mechanism here includes an extended pusher bar 72 mounted, by slides 74, to an intermediate guide bar arrangement 76. That guide bar arrangement 76 can, itself, be extended because it is mounted upon slides 78 which are carried upon a main guide support mechanism 80. Suitable fluid power cylinders (not shown) are employed to produce operation of the pusher bar 72. The pusher bar 72 is shown in its retracted position, FIGS. 2 and 3, and in a partially extended position in FIG. 4. This motion of the pusher bar 72 serves to dislodge the top-most layer L of filled bags B from the array A, transfering the layer L to a position atop the transfer table 86.

Figure 5:
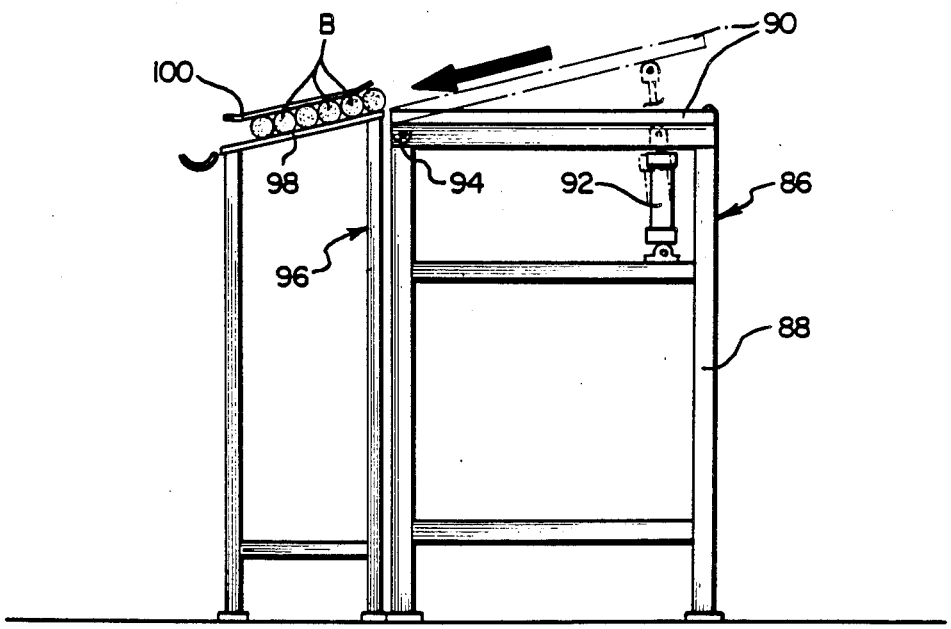
FIG. 5 is a side elevational view showing a de-palletizer receiving table and associated apparatus.

As especially shown in FIG. 5, the transfer table 86 includes support structure 88 and a table top 90 adapted to receive the bags B of the displaced layer L. A hydraulic cylinder or other suitable device 92 is connected to the table top 90. On command, the cylinder 92 is activated, and the table top 90 is pivoted about a pivot pin 94 which serves to connect the table 90 to the support structure 88. When the table tips, the filled bags B roll or slide down the table top 90 and away from the table 86, as can be envisioned from FIG. 5. To conserve floor space, the transfer table 90 is here arranged to discharge the bagged articles B in a direction perpendicular to that from which the articles or bags are pushed by the pusher bar 72, as indicated by the arrows 91 and 93, FIG. 2.

Figure 6:
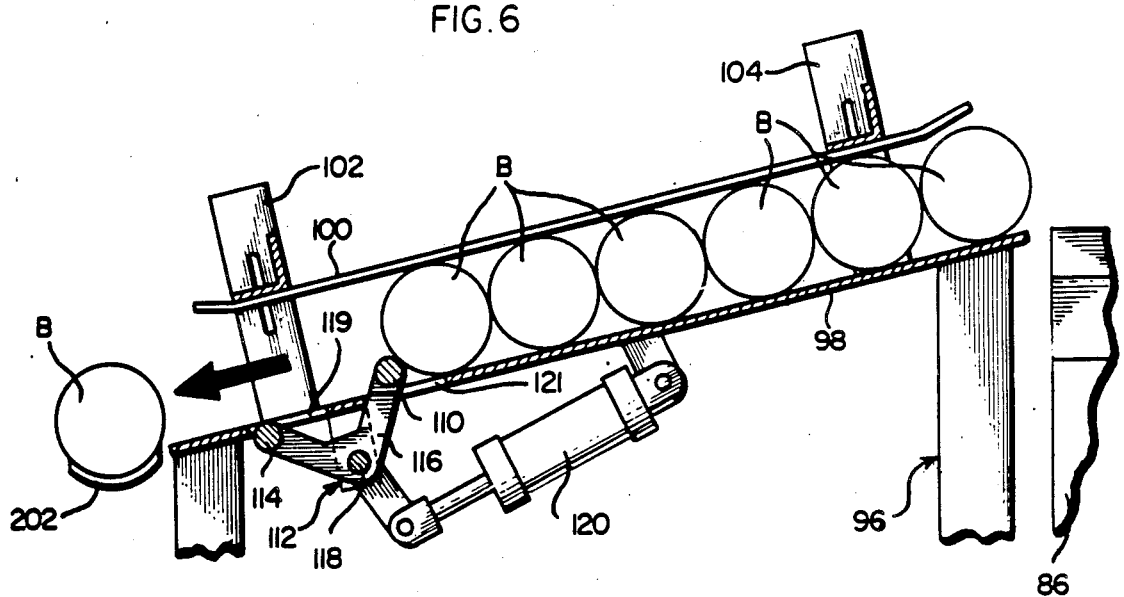
FIG. 6 is a fragmentary side elevational view in partial section taken substantially in the plane of line 6—6 in FIG. 10 and showing a de-palletizer escapement mechanism in a first operating position.

Articles coming off the transfer table top 90 are received at an escapement stand 96. This escapement stand 96 permits each bag of articles B to be sequentially discharged at the proper time for further manipulation. To this end, as shown in FIGS. 5-8, the escapement stand 96 includes an inclined support presentment surface 98 over which are mounted restrainer bars 100. Means for mounting these bars 100 atop the table 96 can include ordinary channel iron members 102, 104, as shown in FIG. 6.

Figure 7:
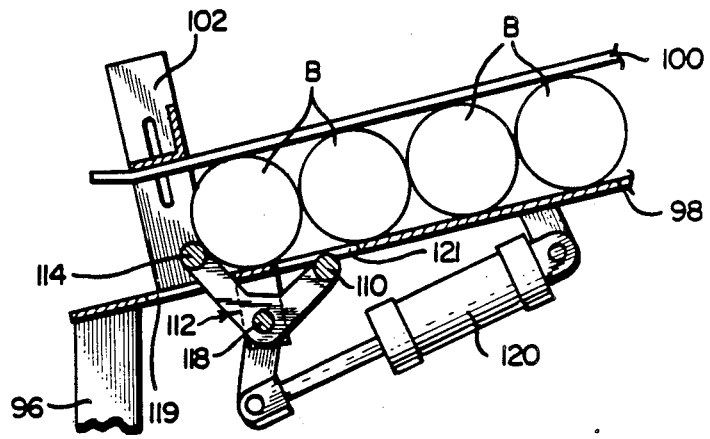
FIG. 7 is a fragmentary side elevational view in partial section similar to FIG. 6 but showing the escapement mechanism in a second operating position.
Figure 8:
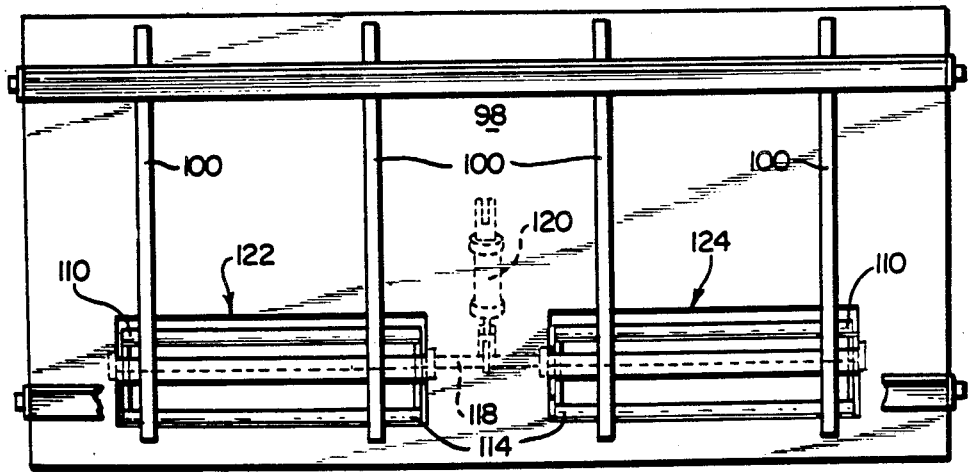
FIG. 8 is a top plan view showing the escapement mechanism in further detail.

With reference to FIGS. 6-8, the bags B rolling or sliding over the inclined presentment surface 98 are halted by the first stop bar 110 of an escapement mechanism 112. As illustrated particularly in FIGS. 6 and 7, this pivotally oscillating escapement mechanism 112 includes the first bar 110 and a second bar 114 which are fixedly interconnected by a Y-shaped support mechanism 116. This Y-shaped mechanism 116 is pivotally mounted to an elongated shaft or pin 118 located below the presentment surface 98. The first and second stop bars 110, 114 are rigidly spaced apart from one another by a distance sufficient to permit a single filled bag B to interpose itself between the bars, as suggested in FIG. 7. When an actuating fluid cylinder 120 is appropriately operated, the second stop bar 114 is moved arcuately downwardly from the FIG. 7 position to the FIG. 6 position through a hole 119, thereby permitting a bag B to roll or slide forward into receiving tray 202. Simultaneously, however, the first bar 110 is moved or pivoted upwardly through an opening 121 in the table 98 so as to engage a succeeding bag B and inhibit its further motion. As the cylinder 120 repositions the escapement mechanism 112 from the position shown in FIG. 6 to that as shown in FIG. 7, the foremost bag of articles B indexes itself into the illustrated ready-for-discharge position. As suggested in FIG. 8, several escapement mechanisms 122, 124 can be provided so as to securely engage and control the motion of a single bag of articles which is elongated in its nature.

Thus, the de-palletizing apparatus 10 can automatically handle a full pallet of bagged articles B, and automatically remove the bags B from the pallet array A and deliver the bags B individually to a receiving tray 202, FIG. 1 and FIG. 6, which is associated with the de-bagging apparatus 12. Further, the tape removal mechanism 54 of the de-palletizing apparatus 10 will automatically take-up any support wrapping used to maintain the array of bags B in position on the pallet P. Thus the bags B are now ready for the bag removal procedure to be performed by the de-bagging apparatus 12, to be discussed hereinafter. It should be noted, however, with regard to the description of the apparatus 12 to follow in conjunction with FIGS. 1 and 9-28, that the orientation of the de-palletizing apparatus 10 has been reversed from FIGS. 2-8. This was done for purposes of illustration and clarity.

The De-Bagging Apparatus

Figure 10:
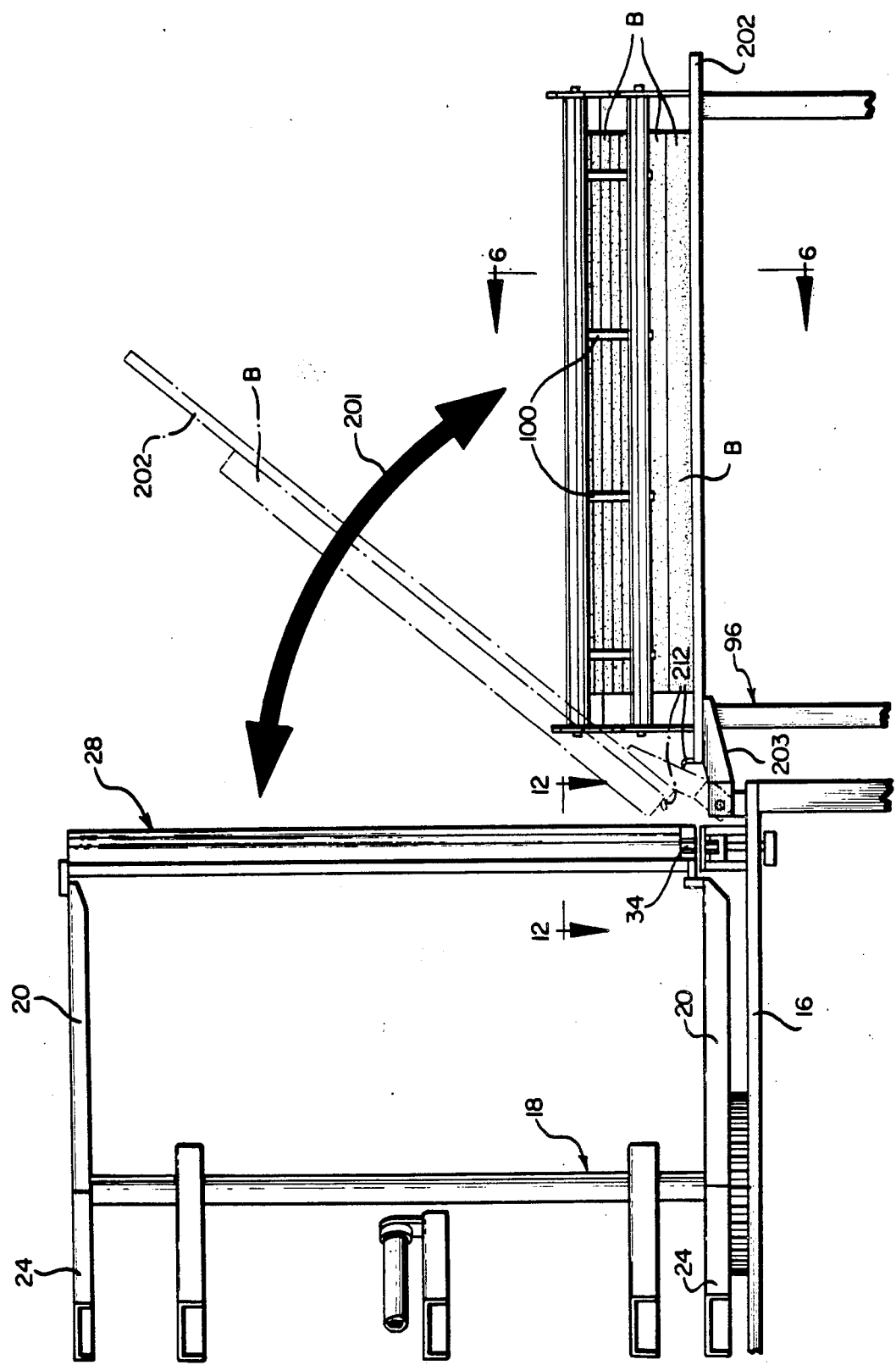
FIG. 10 is a side elevational view showing in further detail the de-bagging apparatus and the associated de-palletizing escapement mechanism, portions of the de-palletizing apparatus having been re-located for purposes of clarity.

Each individual de-palletized bag B is transferred to the de-bagging apparatus 12 shown in FIGS. 9, 10 and elsewhere. As illustrated particularly in FIG. 9, the discharged bag B of stacked can ends or other articles is delivered to a receiving and orienter tray 202 which is pivotally mounted on the frame 203 of the de-bagger apparatus 12. This pivoting motion of the tray 202 moves the cradled bag of articles B from a generally horizontal position to a generally vertical position, as indicated by the arrow 201. Suitable means (not shown) such as a fluid power cylinder or other device can be employed at appropriate times in the machine operating cycle to pivot the tray 202 between the vertical and horizontal positions.

Figure 11:
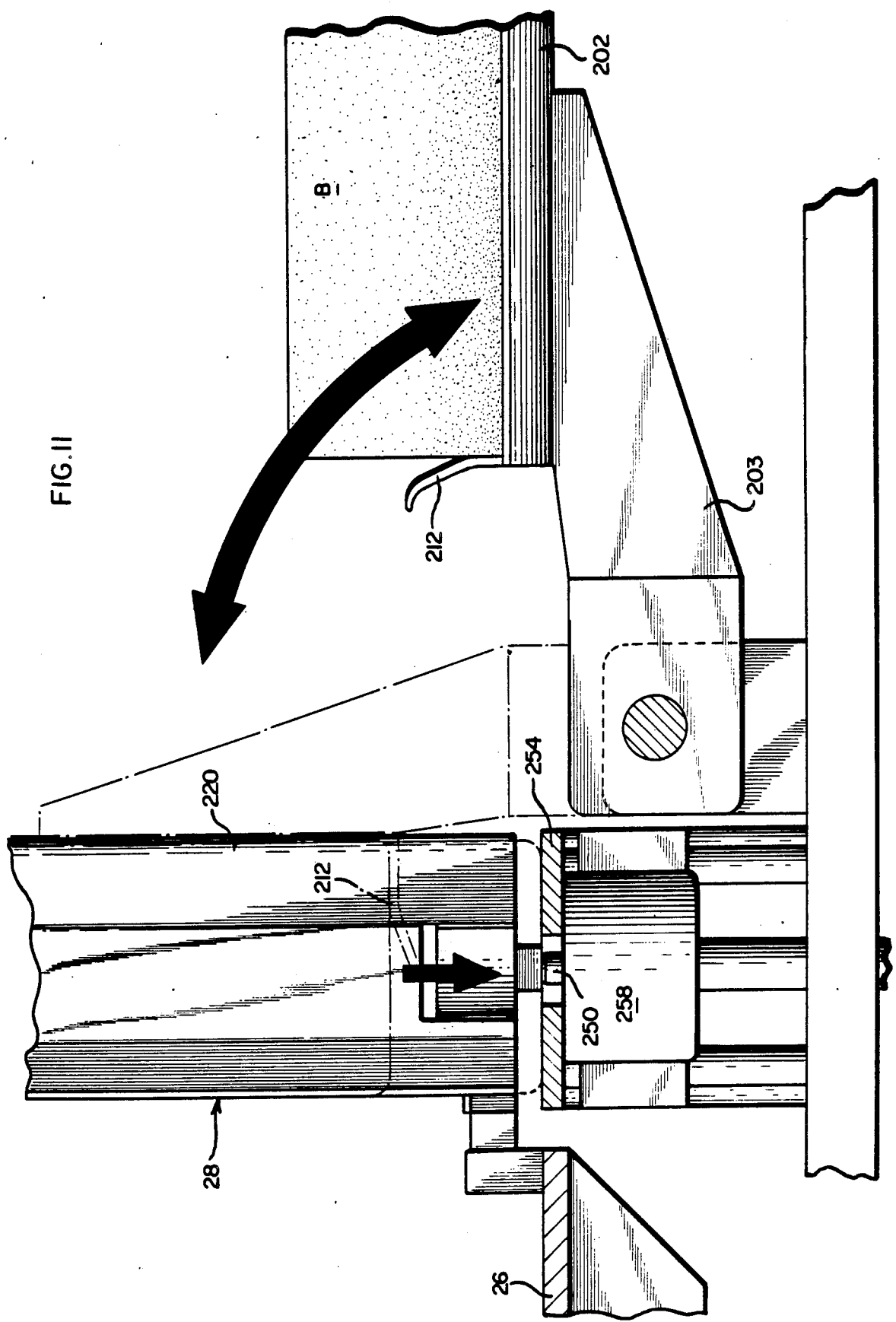
FIG. 11 is a sectional view taken substantially in the plane of line 11—11 in FIG. 12 and showing the stack orienting mechanism at a first station.
Figure 12:
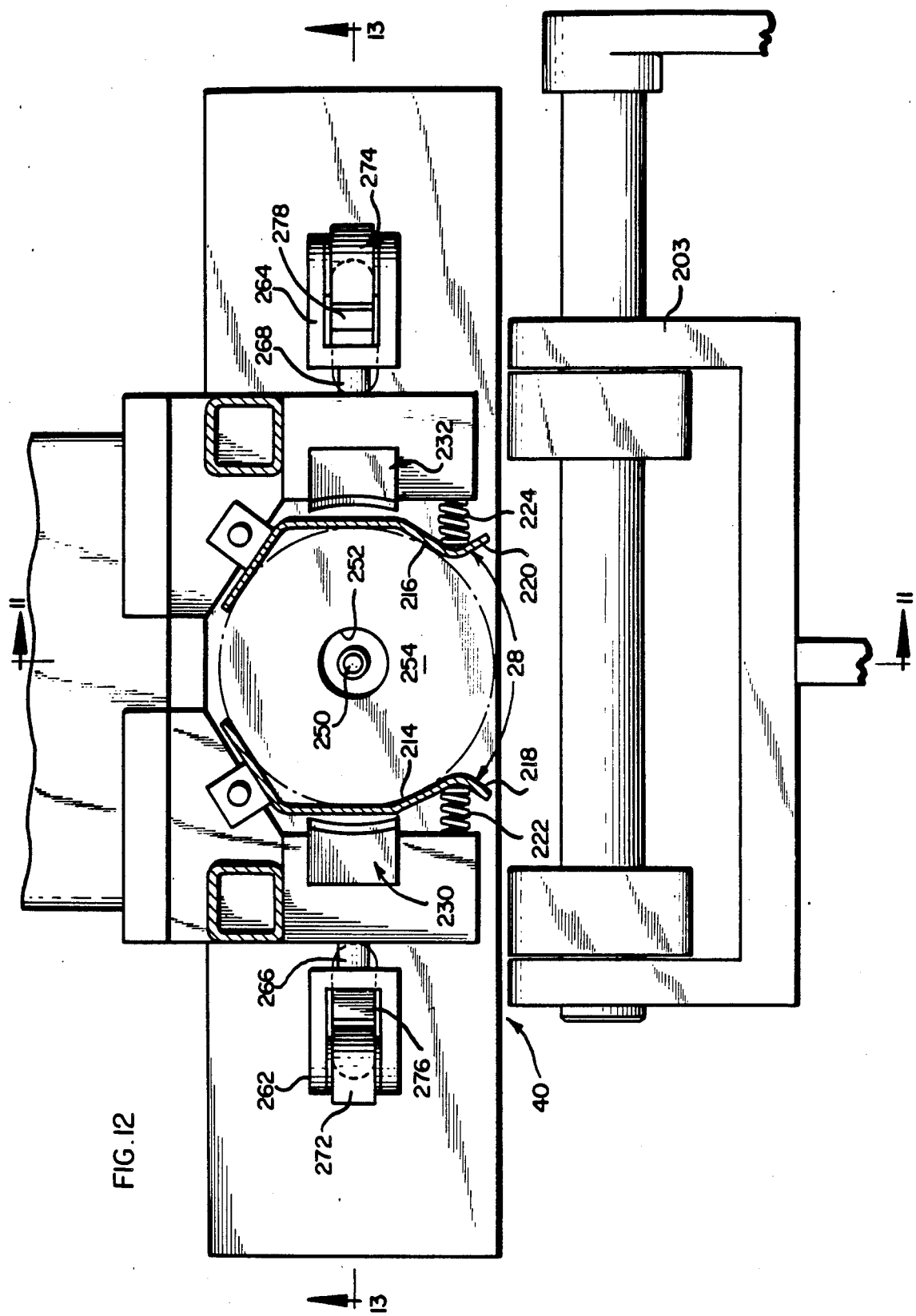
FIG. 12 is a sectional view taken substantially in the plane of line 12—12 in FIG. 10 and showing other parts of the stack orienting and space developing mechanisms.

When the bag B of articles reaches the vertical position shown in FIG. 10, it is pushed by the tray 202 into an elongated receiving or transport pocket 28 carried for movement around the de-bagging apparatus by the frame legs 20. While carried in this pocket 28, the bag and articles are continuously maintained in the vertically oriented position. To encourage the bag B and contained articles E to transfer smoothly from the orientor tray 202 to the vertically elongated pocket 28, a slanted discharge tongue 212 forms a bottom stop portion of the tray 202. As the articles are swung into the pocket 28, they are retentively engaged by the pivoted, spring-loaded sides 214, 216 which form the pocket 28 as shown in FIGS. 11 and 12. As the bag B and articles E are pushed toward and into the pocket 28, wall lips 218, 220 are first engaged, and the walls are then spread apart against the action of springs 222, 224. When the articles have been fully inserted into the pocket 28 into the position illustrated in FIG. 12, the springs 222, 224 urge the walls 214, 216 back into the illustrated, article-surrounding and grasping position. When the tray 202 is pivoted back or away from the pocket 28 as suggested in FIG. 11, the articles smoothly slip off the bottom tongue 212 and drop downwardly to rest, temporarily, upon an elevated stationary support platform 254.

After the bag of articles B has been retentively loaded into the vertically elongated position in the pocket 28, and prepatory to the removal of the bag B a void or space is developed between the bag and the bagged articles proximate the bottom end of the bag. This is accomplished by the apparatus illustrated in FIGS. 12, 13 and 14, and in the manner suggested in FIGS. 20 and 21, as will be discussed. To create this void or space within the bag and between the bag and the contained articles in accordance with the invention, the pocket 28 is equipped with a clamp assembly 34 which includes opposed bag-engaging clamp mechanisms 230, 232 at the bottom of the pocket walls 214, 216. Here, each clamp mechanism 230, 232 includes a mount 234, 236 fixed to the pocket 28 and a reciprocable head 238, 240. When the clamp heads 238, 240 are moved into forward positions such as that suggested in FIG. 14, aggressive surfaces 242, 244 grippingly and retentively engage the outside surface of the bag B from mutually opposed directions. This bag-engaging and article-squeezing pressure is provided by clamping springs 246, 248 which urge the heads 238, 240 and the bag-engaging surfaces 242, 244 into engagement with the bag B.

It should be noted that the pressure applied by the clamp mechanism 230, 232 is controlled and selected such that while the ends or articles E are gripped they can be forced upwardly relative to the bag bottom 245. Thus, after the clamp heads 238, 240 engage the bag B as suggested in FIGS. 14 and 21, the ends E are pushed upwardly within the bag so as to form a space or void V between the bottom of the bag and the bottom end E. This is accomplished by a small article-positioning pin 250 which is urged upwardly through a hole 252 in the platform 254. The platform 254 and its associated structure is stationary, and similar platforms are provided at the stripper station 44 and the transfer station 46. The upward motion of the pin 250 is produced by a small hydraulic cylinder 258, as suggested in FIGS. 14, 20 and 21. It will be understood that, while the pin 250 moves the ends E upwardly in the bag B, the pin 250 preferably does not itself penetrate that bag B. Rather, the pin pushes the articles E into a predetermined position from a point outside the bag B without penetrating the bag. As the articles E are moved upwardly by the pin 250, the bag is retained in its position by the inward or engagement motion of the aggressive clamping surfaces 242, 244. Also, after the ends E are moved upwardly, the clamping mechanism 230, 232 will maintain the ends E in the position of FIG. 14; that is spaced from the bottom on the bag.

Figure 13:
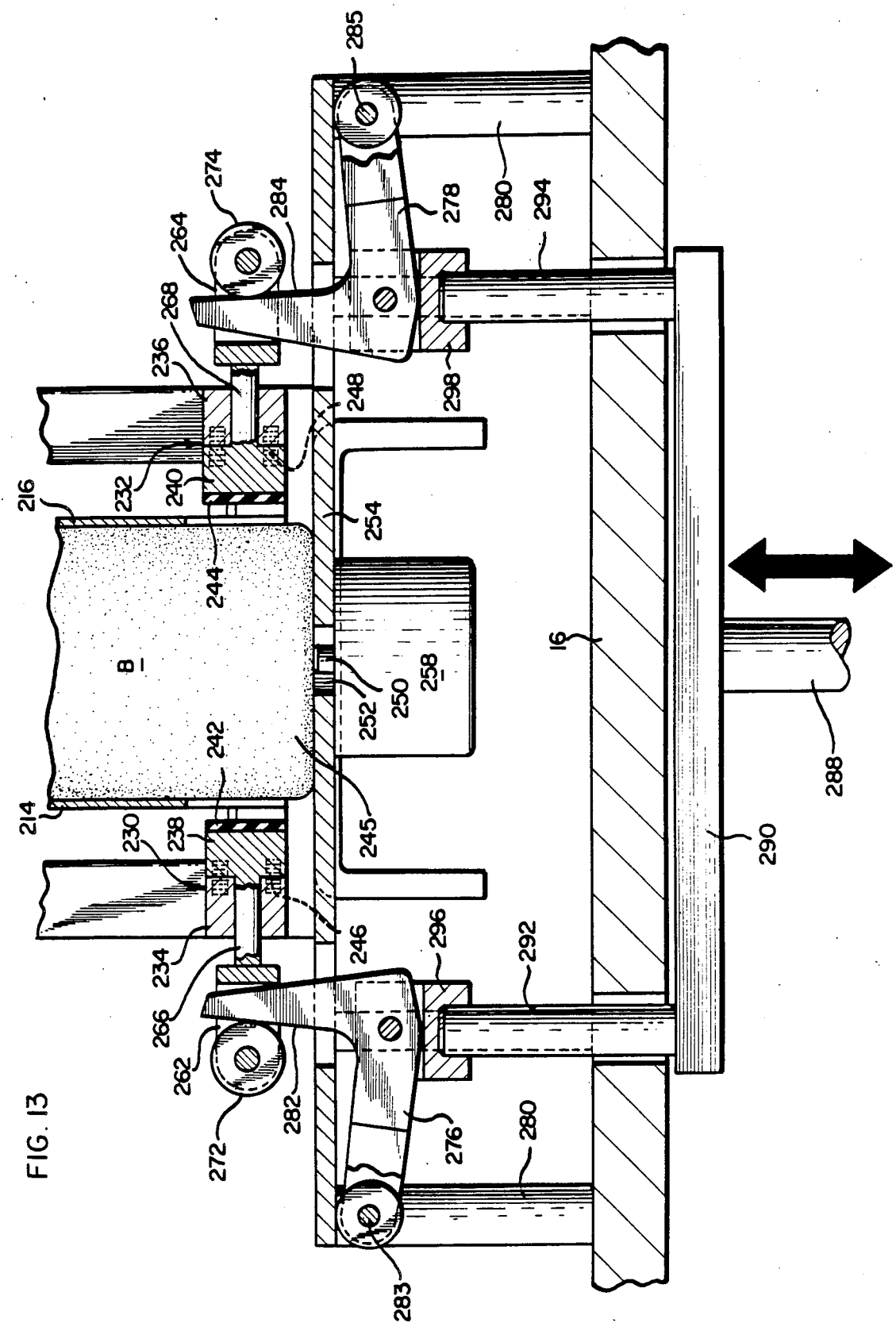
FIG. 13 is a fragmentary sectional view taken substantially in the plane of line 13—13 in FIG. 12 and showing in further detail parts of the space developing mechanisms.
Figure 14:
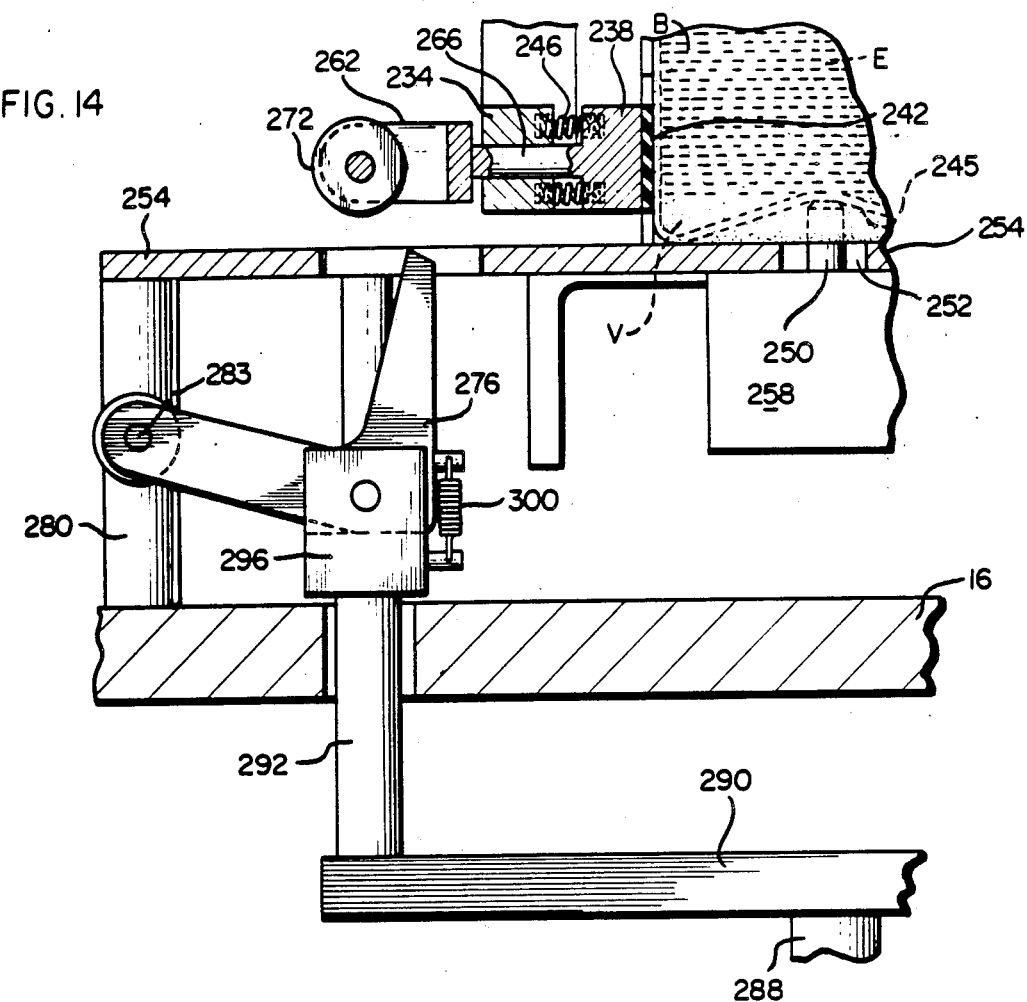
FIG. 14 is a fragmentary sectional view similar to FIG. 13 and taken substantially in the plane of line 13—13 in FIG. 12 but showing the space developing mechanism in another configuration.

As explained above, a clamp mechanism 34, 36 or 38 is provided at the bottom of each movable pocket 28, 30 and 32. At each station 40, 44 and 46, the clamps must be operated between the clamp-open and the clamp-closed positions. For example, at the first or loading station 40 shown in FIGS. 12 and 13, the clamp heads 242, 244 must be retracted to permit pocket loading. For that purpose, a cam system is provided for each clamp head, as shown in FIGS. 13, 14 and elsewhere. As illustrated, each clamp head 238, 240 is connected to a cam yoke 262, 264 by a follower pin 266, 268. These pins 266, 268 move reciprocally through the clamp bases 234, 236 and provide the desired linear oscillatory motion to the heads 238 and 240. Each cam follower yoke 262, 264 is provided with a cam follower or roller 272, 274. The heads, yokes, pins, cam rollers and bases are all carried by the pocket structures 28, 30 and 32.

To open the clamps 230, 232, the follower rollers 272, 274 are engaged by arm cam devices 276, 278 located permanently at the first station 40, and also at each of the second and third stations 44, 46. As can be envisioned from comparing FIG. 14 with FIG. 13, the arm cam actuators 276, 278 can be pivoted upward so as to engage the cam follower rollers 272, 274. The shape of the arm cam surfaces 282, 284 is such as to catch the follower rollers 272, 274, and then urge the rollers 272, 274 and the attached clamp heads 242, 244 radially outwardly as the arm cams 276, 278 move upwardly, against the force of the springs 246, 248. The arm cams 276, 278 are conveniently journaled to adjacent superstructure 280 as by pins 283, 285.

Arm cam rotational motion is here caused by a single fluid power piston rod 288, which acts in a vertical direction as suggested in FIG. 13, which rod 288 is part of a fluid actuator (not shown) that is operated by the control logic of the system. This piston rod 288 is connected to an extender arm 290 and pins 292, 294 which are attached, by journal blocks 296, 298 to the arm cams 276, 278. As can be envisioned, upward motion of the piston rod 288 causes upward rotational motion of the arm cams 276, 278 and withdrawal of the clamp heads 238, 240. Downward motion of the piston rod 288 permits the clamp heads 238, 240 to move forward and engage the bags B by the aggressive surfaces 242, 244. If desired, springs 300 can be provided to assure positive withdrawal of the arm cams from engagement with the cam followers, as shown in FIG. 14.

As can be envisioned from FIGS. 9, 13 and 14, when the arm cams 276 and 278 are withdrawn below the platform 254, the bag clamp heads 238 and 240 are biased toward each other under the action of springs 246, 248 to engage the bag. Then, when the pin 250 is erected, the void or space V is formed within the bag B, between the bottom of the bag 245 and the lowermost end E.

With the void V now created, the frame 18 (FIG. 1) is rotated through substantially 120 degrees, so as to bring the pocket 28 and bag B from the first station 40 past the slitting station 42 to the second station 44. During this motion, the bag B and articles or ends E are held within the pocket 28 by the compressive action of the clamp mechanism 34 and the wall sides 214, 216.

Figure 15:
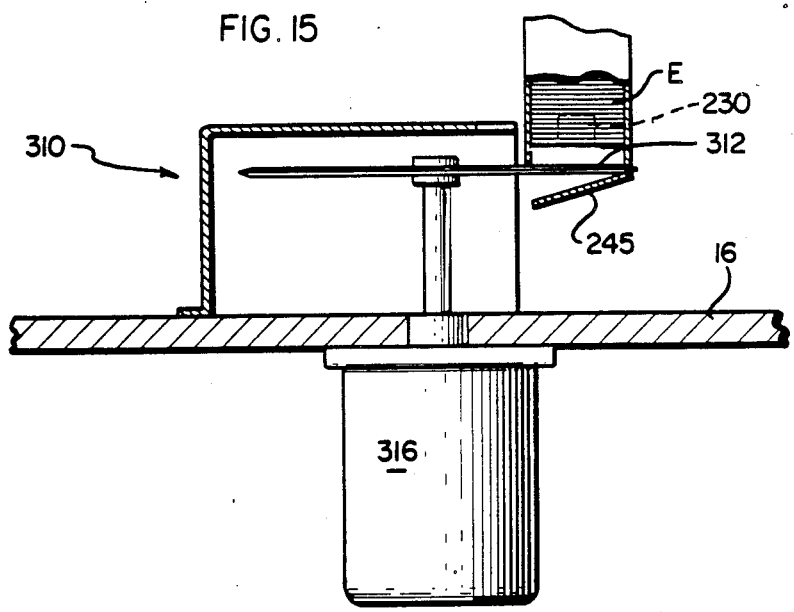
FIG. 15 is a fragmentary elevational view of the rotary knife slitter mechanism taken substantially in the plane of line 15—15 in FIG. 1.

The slitting station 42 is shown in FIGS. 15 and 22. As the bag B and contained articles E are swung past this slitting point 42, a slitter mechanism 310 severs the bottom 245 of the bag B from the remaining bag portions. In the embodiment illustrated here, this slitter mechanism 310 takes the form of a rotary knife 312. The rotary knife 312 is driven within a housing 314 by a suitable motor 316 or other device. Here, the motor 316 is mounted below the de-bagger table top 16. The slitter 310 could also take the form of a laser or other appropriate severing means of known design.

When the bag is severed, the bag bottom 245 drops away. As suggested in FIG. 22, the bottom 245 can be dropped down an appropriate chute 318 and routed to a disposal device such as a paper shredder. If desired, a separator device such as an air jet 320 can be positioned, as shown in FIG. 22, to assist in separating the slit portions of the bag B and 245 from one another.

Figure 16:
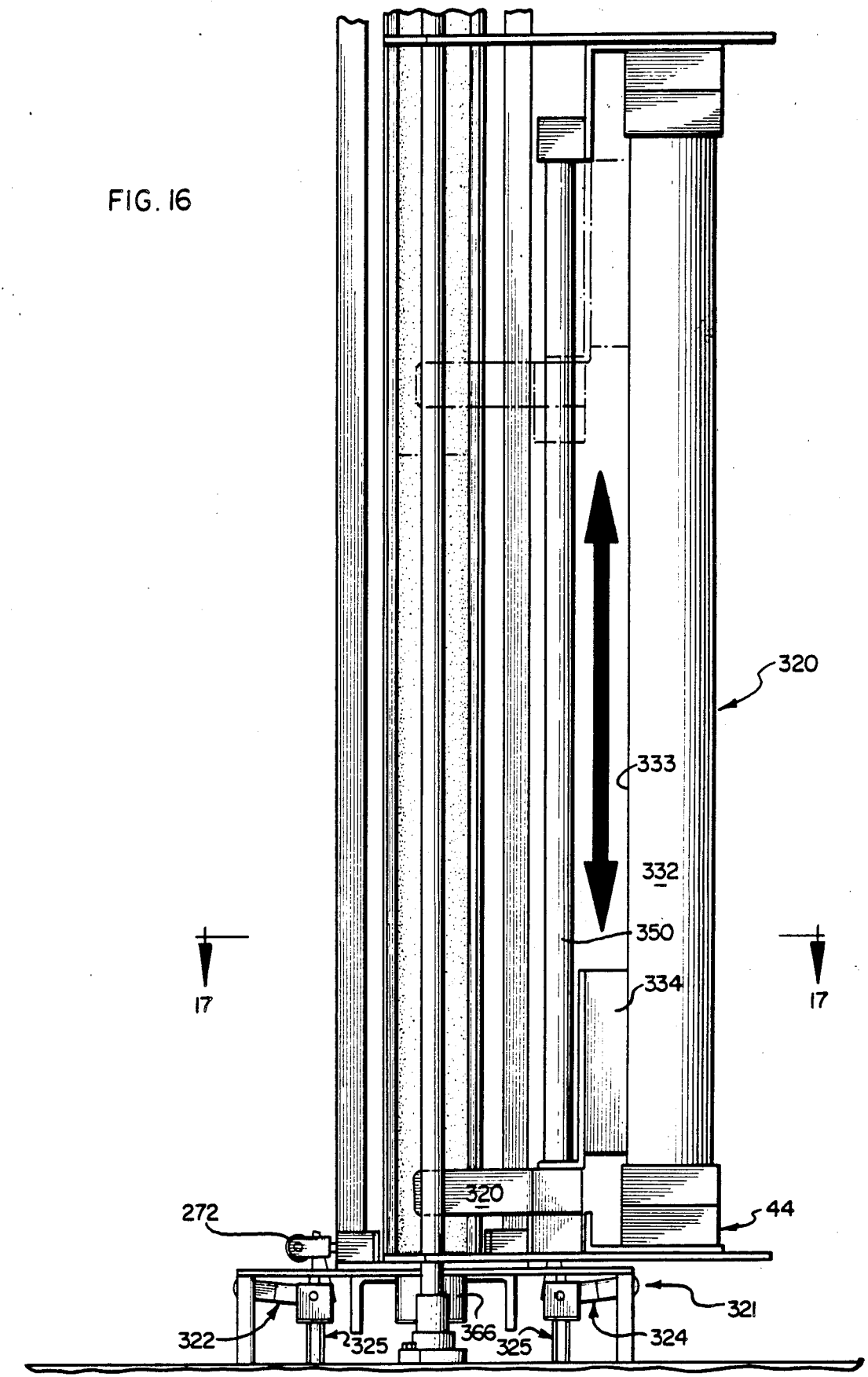
FIG. 16 is a side elevational view taken substantially in the plane of line 16—16 in FIG. 1 and showing in further detail the stripper means for stripping the slit bag from the stack of can ends at a second station of the apparatus.
Figure 17:
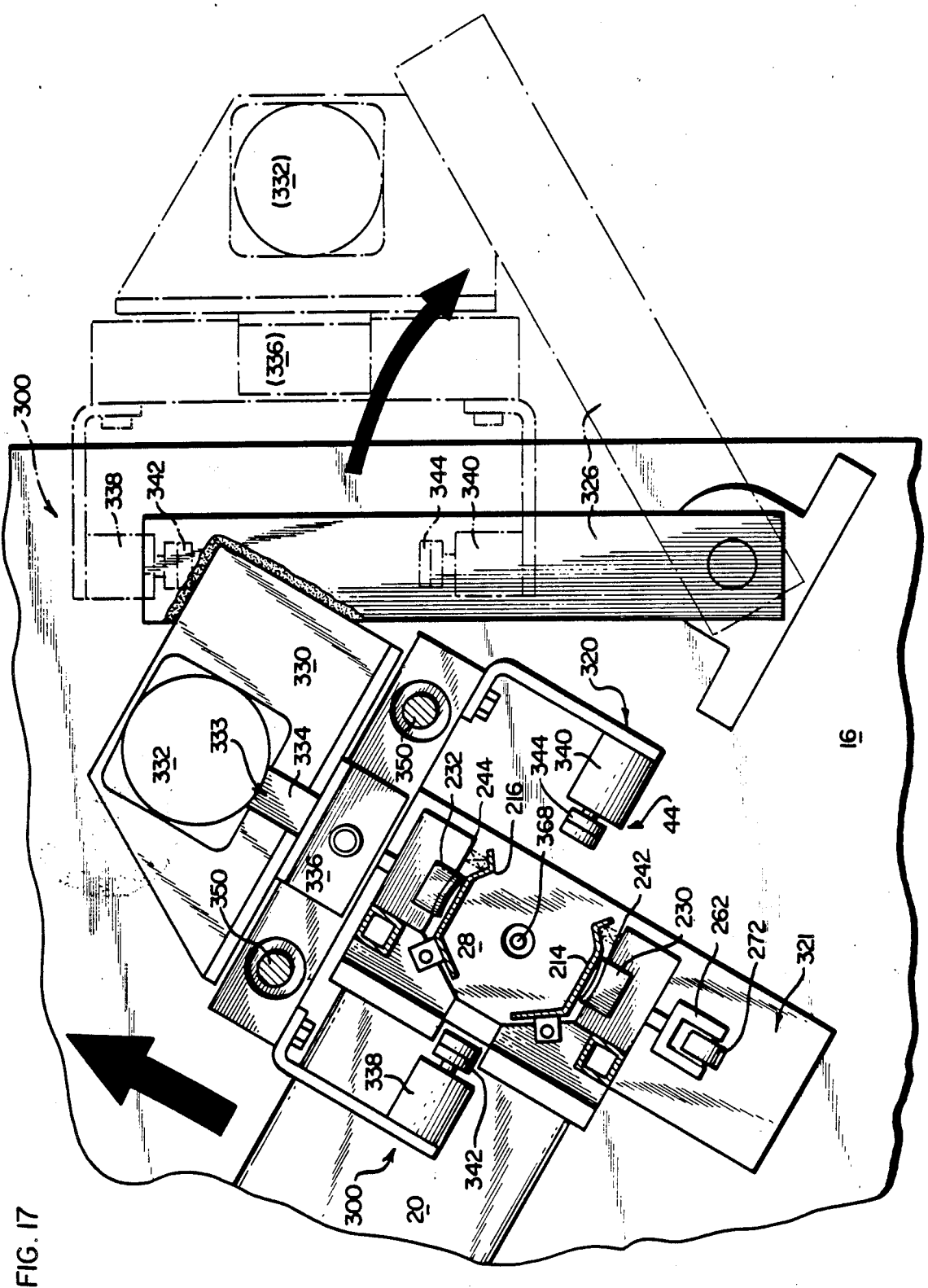
FIG. 17 is a fragmentary sectional view taken substantially in the plane of line 17—17 in FIG. 16 and showing in further detail the bag stripper mechanism.

After the bag bottom 245 has been removed, the bag B and contained articles E are transferred to the second or bag stripper station 44 shown in FIGS. 16 and 17. During movement from the receiving station 40, past slitter 42, to the stripper station 44, the ends E are held in place by the clamp mechanism. Thus, upon reaching stripper station 44, motion of the frame 18 is stopped and the tray 28 is positioned over a stationary platform 321 which is similar to platform 254 discussed with regard to the first station 40. More specifically, the platform 321, FIG. 16, includes cam arm devices 322, 324 and actuator means, indicated generally at 325. Once the tray 28 is in position the control system will energize the actuator means 325 to cause the arm cam devices 322, 324 to engage the first clamps 230, 232 so as to again pull the clamp heads 238, 240 and aggressive surfaces 242, 244 away from the bag B and article E into the withdrawn positions shown in FIG. 17. As the clamps 238, 240 are withdrawing, a small air cylinder 366 is actuated to extend a support pin 368 which supports the ends E in position, FIGS. 23 and 24, or the ends E can rest directly upon the upper surface of the platform 321. These arm cam devices 322, 324 can be identical with the first station arm cam mechanisms 276–290 described above. While the clamp heads 238, 240 are withdrawn, the articles E and severed bag B temporarily drop upon and are then supported by a station platform 321.

As the first tray mounted clamps 230, 232 are being withdrawn, a second clamping mechanism designated generally 300 is swung into position to gently engage the severed bag B. This second clamping mechanism 300 is mounted on a swing arm 326 for movement between the position shown in solid lines and the position shown in dotted lines in FIG. 17. Welded to a distal end of this swing arm 326 is a columnar structure 330 which mounts a special fluid power cylinder 332. This special fluid power cylinder 332 can conveniently be an ORIGA cylinder sold by ORIGA International A.B., Kungsor, Sweden. The ORIGA cylinder 332 is provided with a slit 333 along its length. A lug 334 extends through the slit 333 from a free-floating piston (not shown) inside the cylinder, and a thin steel band covers the slit at the cylinder inner surfaces. By appropriately pressurizing either the top or the bottom ends of the cylinder, the piston and attached lug 334 are transported up or down the length of the cylinder 332.

Continuing with a description of the second, bag stripper clamping mechanism 300, attached to the lug 334 is a crossbar 336 which carries a second set of bag gripper clamps 338, 340. These bag gripper clamps 338 and 340 are provided with respective bag-surface-engaging heads or pads 342, 344 which can be reciprocably moved toward and into engagement with the bag B, as suggested particularly in FIGS. 17 and 24. By energizing the ORIGA cylinder 332, the crossbar 336 and the bag gripper clamps 338, 340 are moved upwardly along the stack of can ends E, thereby pulling the bag B upwardly, as suggested in FIGS. 16 and 25. Guide rods 350 can be provided to ensure smooth linear motion of the clamps 338, 340 as the clamps are moved upwardly from first or lower positions shown in dotted lines in FIG. 25 to second or upper positions shown in solid lines.

Figure 25:
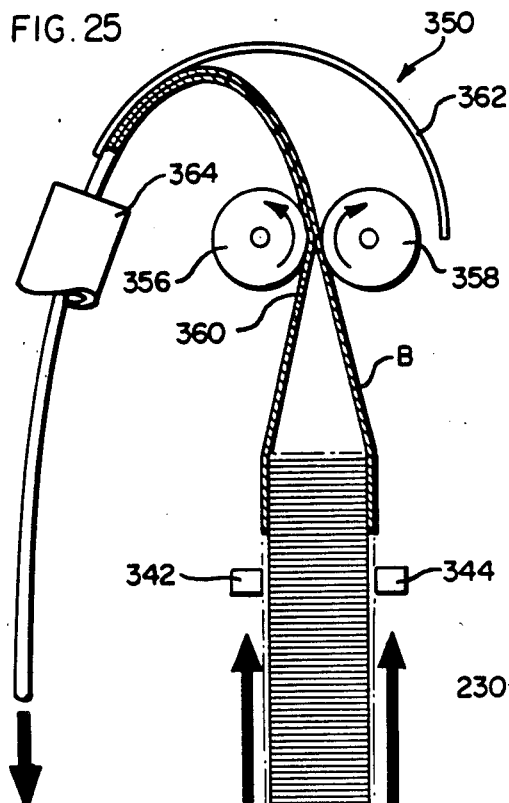

As shown in FIG. 25, the bag gripper clamps 342, 344 of the illustrated embodiment effect only partial removal of the bag B. Final removal is accomplished by bag discarding mechanism designated generally 350. More specifically, to assist in stripping off the bag B, a pair of interacting bag puller rollers 356, 358, are provided, which are mounted above the platform 321. The bag is propelled upwardly by the clamps 342 and 344 to bring the upper end of the bag B into engagement with the roller nip 360. The rollers 356 and 358 are counter-rotating and force the bag B into contact with a bag guide member 362, wherein the bag is guided to a disposal mechanism such as a vacuum removal system 364 which can lead to a paper shredder or similar discard system. As the top end of the bag B is engaged by the rollers 356, 358, the control system will release the clamps 342, 344.

Figure 18:
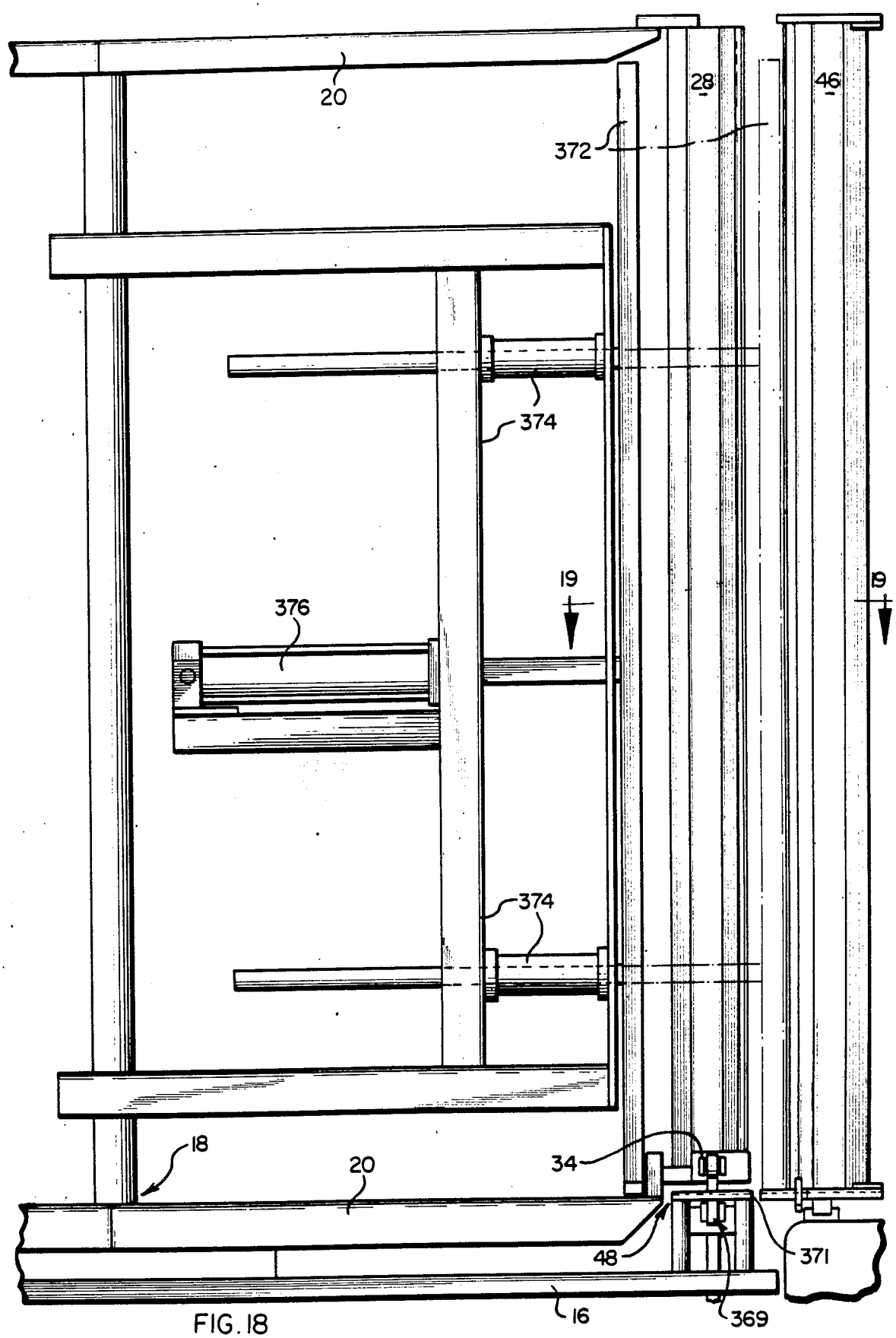
FIG. 18 is a side elevational view taken substantially in the plane of line 18—18 in FIG. 1 and showing the can end stack transfer mechanism at a third station of the apparatus.
Figure 19:
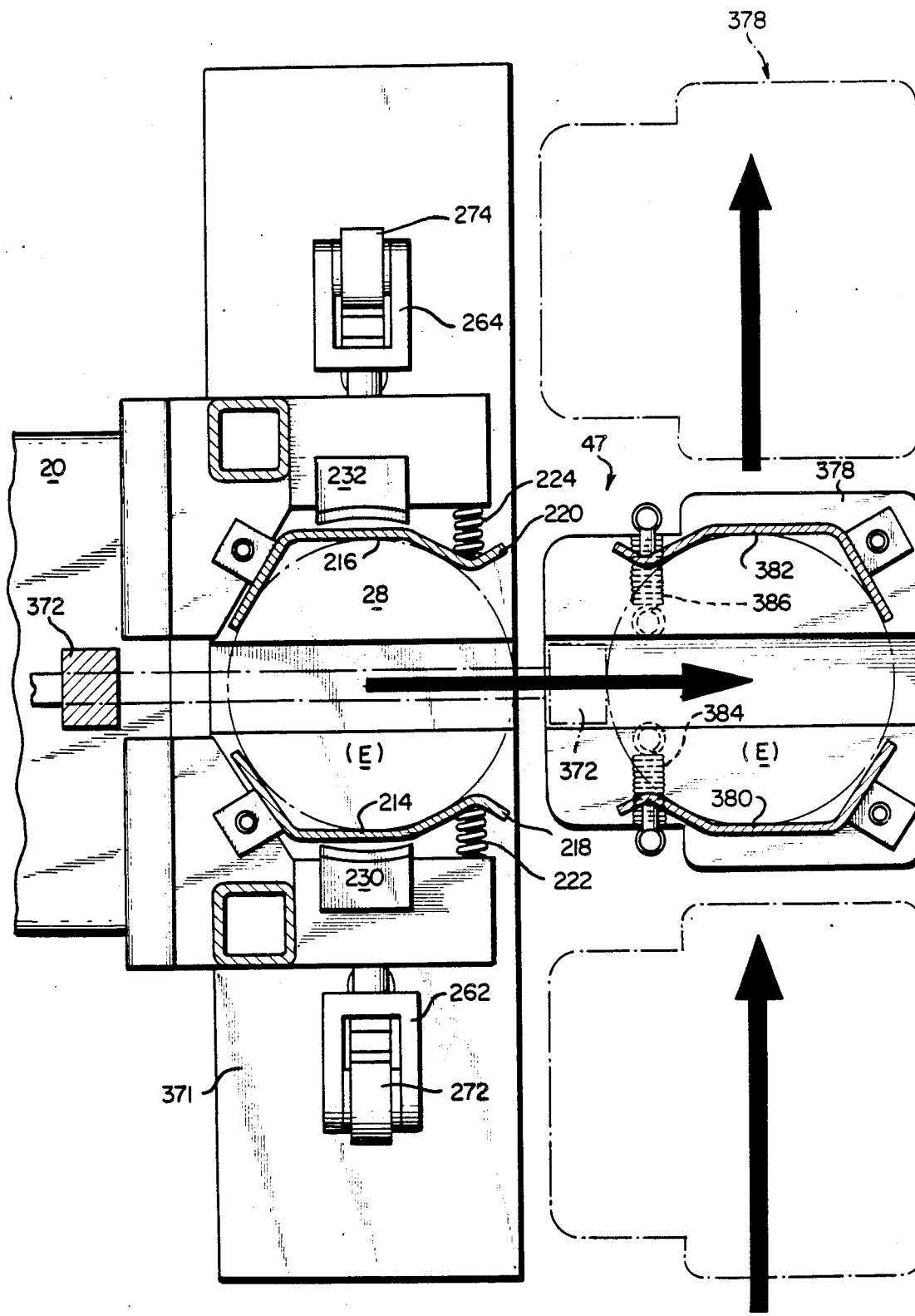
FIG. 19 is a fragmentary sectional view taken substantially in the plane of line 19—19 in FIG. 18 and showing the can end stack transfer mechanism in further detail, portions of the apparatus being reversed for clarity.
Figure 26:
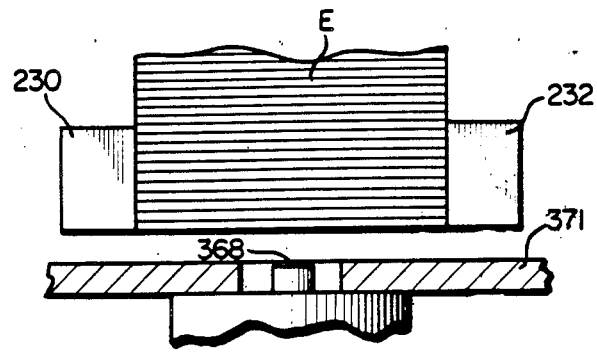
Figure 27:
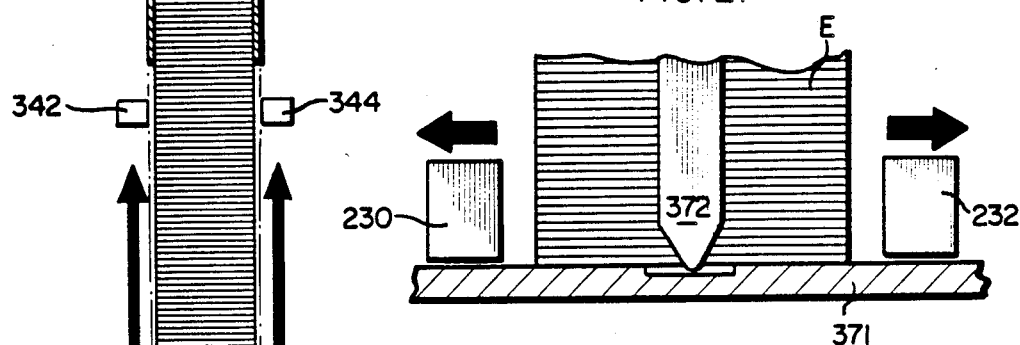
Figure 28:
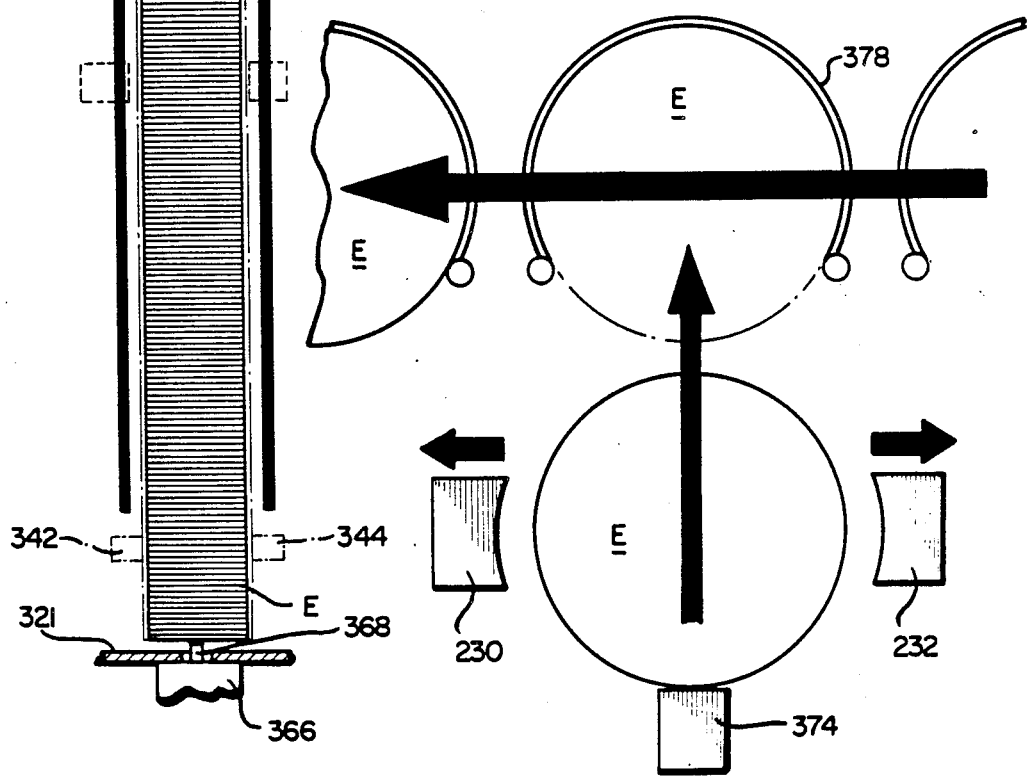

After the bag B has been removed and discarded, the air cylinder 366 forces pin 368 up to engage the can ends E, and the bottom clamp mechanisms 238, 240 are re-engaged to grip the ends E in the pocket 28, as shown in FIG. 26. The pin 361 is retracted and the clamped stack of ends E are ready for transport. The now de-bagged and clamped stack of ends E is next rotated to the third or delivery station 48. Transfer station 48 includes a stationary platform 371 similar to the platform 254 and 321 at stations 40 and 44, in that there is provided a cam mechanism for retracting the clamps 230, 232 gripping the ends E. As shown in FIGS. 18, 19, 27 and 28, the clamps 230, 232 are again withdrawn by a cam mechanism 369, which is permanently associated with the third station 48, but which can be identical in its design to the cam mechanism 276–290 described above. Release of the clamps deposits the stack of ends E on the grooved floor or station 371. A pusher bar 372, FIGS. 19, 27 and 28, is mounted behind the platform 371 at station 48 and is operated such that it engages the stack of ends E and urges the stack out of the pocket 28 and into downstream processing machinery 47. The pusher bar is guided by guide structure 374, and is moved by a fluid power cylinder 376, as shown in FIG. 18.

As illustrated especially in FIGS. 1, 19 and 28, the downstream processing machinery 47 which receives the ends E can be a rotary carousel infeed-type device 47 having a series of moving pockets 378 adapted to receive the de-bagged ends E. These pockets can be defined by walls 380, 382 urged into the illustrated article-retaining position by springs 384, 386. The various stacks of ends E are stored in the device 47 for supply to the fabricating or can assembly machinery (not shown).

Figure 29:
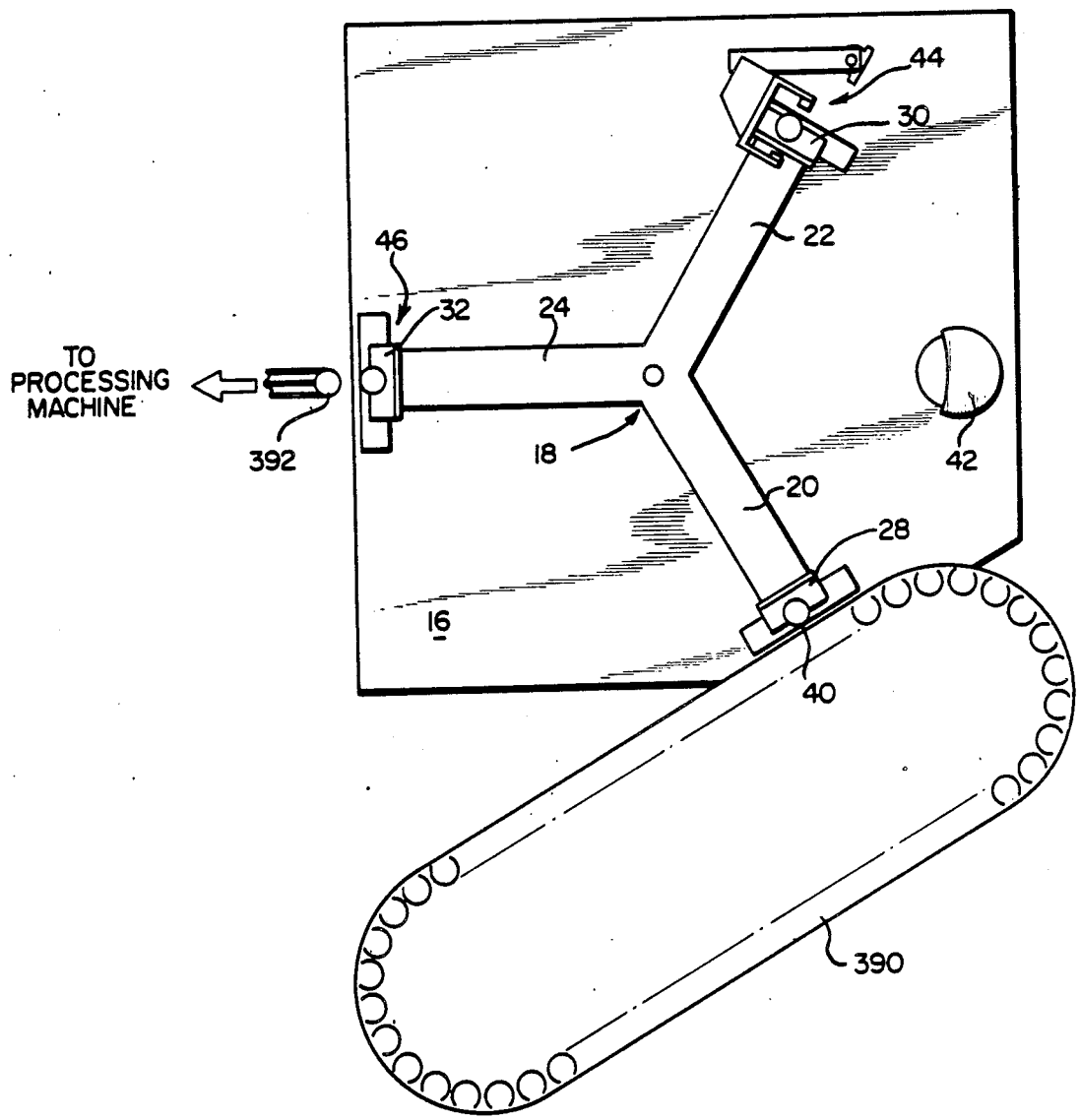
FIG. 29 is a top plan view similar to FIG. 1 but showing an alternate embodiment of the apparatus, wherein filled bags are initially stored in an infeed unit of known design and are removed for de-bagging and delivery to the supply chute of a processing machine.

As an alternative to the system of FIG. 1, a system in accordance with FIG. 29 may be used in conjunction with the de-bagging apparatus 12 disclosed herein. More specifically, the bags of ends are initially stored in a rotary infeed unit 390, of the type disclosed in the aforementioned patent, and from here they are supplied to the pockets 28, 30 and 32 for bag removal, at the supply station 40. In this arrangement, the orienter means can be considered to be the rotary infeed device 390 itself, and no pivot tray 202 is required. The bags can be slit at the slitter point 42 and removed at the de-bagging station 44 as described above. The de-bagged articles are then conveyed to the transfer station 46 for delivery to the intake 392 of a downstream can closing or other processing machine.

The control and/or logic arrangement for the machine 10, 12 includes state of the art microprocessing and other circuitry. The specific details of the control arrangement are not deemed critical or necessary to an understanding of the present invention, as those skilled in the art can devise numerous control systems for attaining the desired mode of operation. Therefore only such details as are necessary to a full and complete understanding of the invention have been included herein. Further, it should be noted that the de-bagging apparatus 12 preferably functions sequentially, in that while a bag B of ends E is being loaded at supply station 40, the bag is being stripped from a second stack of ends E at station 44, and correspondingly, a de-bagged stack of ends E are being transfered from station 46 to the downstream apparatus. While the sequence of operation is believed clear from the aforegoing discussion, FIGS.

20–28 illustrate the sequential steps or method performed on the bagged articles E.

While preferred embodiments of the apparatus and method of the invention have been illustrated and described, it is to be understood that those skilled in the art may devise certain variations, modifications and/or substitutions of the specific components illustrated and disclosed, without department from the spirit and scope of the invention, as defined by the claims appended hereto.

The invention is claimed as follows:

1. A method of de-bagging a stack of articles such as a stack of can ends contained in a bag, comprising the steps of, orienting the bag and contained articles, in a vertical position, producing relative movement between the articles and the bag bottom to create a space between the bag bottom and the articles, at least partially slitting the bag at the space and below the lowermost article, and removing the slit bag from the stack of articles.

2. A method according to claim 1 further including the step of transferring the articles to a downstream processing station.

3. A method according to claim 1 including the step of pivoting the bag and contained ends from a horizontally elongated position to the vertically elongated position prior to producing relative movement between the articles and the bag bottom to create the space between the bag and articles.

4. A method according to claim 1 wherein said step of orienting the bag and contained articles includes the step of urging the articles into a movable, vertically elongated pocket at a first station.

5. A method according to claim 4 wherein said step of slitting the bag occurs at a slitting point and said step of removing the bag from the stack of articles occurs at a second station, and wherein the method includes the step of moving the movable pocket and contained bag and articles from the first station past the slitting point to the second station.

6. A method according to claim 4 further including the step of delivering the bag and contained articles to the movable pocket from a palletized array.

7. A method according to claim 1 wherein the step of producing relative movement between the articles and the bag bottom to create a space between the bag and the articles includes the steps of clamping the bag without effecting clamped engagement with the articles and moving the articles relatively to the bag from a point outside the bag without penetrating the bag.

8. A method of de-bagging articles such as a stack of can ends contained within a bag, comprising the steps of, positioning a bag containing said ends in a vertical orientation; moving the ends upwardly relatively to the bag and away from the bottom end of the bag to create a gap between the lowermost can end and the bag bottom; slitting the bag proximate said gap and below the lowermost can end; engaging the bag with stripper means to move the bag longitudinally relatively to the stack of can ends thereby to provide a de-bagged stack of articles.

9. A method according to claim 8 wherein the step of slitting the bag includes moving the bag from a first station to a second station and engaging the bag with a slitter means at some point during the movement from the first to the second station.

* * * * *